United States Patent
Kinjo et al.

(10) Patent No.: US 12,399,077 B2
(45) Date of Patent: Aug. 26, 2025

(54) PRESSURE DETECTION DEVICE

(71) Applicant: Japan Display Inc., Tokyo (JP)

(72) Inventors: Hiroumi Kinjo, Tokyo (JP); Masumi Nishimura, Tokyo (JP)

(73) Assignee: Japan Display Inc., Tokyo (JP)

( * ) Notice: Subject to any disclaimer, the term of this patent is extended or adjusted under 35 U.S.C. 154(b) by 352 days.

(21) Appl. No.: 17/973,841

(22) Filed: Oct. 26, 2022

(65) Prior Publication Data
US 2023/0152177 A1    May 18, 2023

(30) Foreign Application Priority Data
Nov. 18, 2021    (JP) .................................. 2021-187892

(51) Int. Cl.
| | |
|---|---|
| *G01L 19/14* | (2006.01) |
| *G01L 1/20* | (2006.01) |
| *G01L 5/22* | (2006.01) |
| *G06F 3/0354* | (2013.01) |
| *G06F 3/047* | (2006.01) |

(52) U.S. Cl.
CPC ............ *G01L 19/146* (2013.01); *G01L 1/205* (2013.01); *G01L 5/228* (2013.01); *G01L 19/147* (2013.01); *G01L 19/148* (2013.01); *G06F 3/03547* (2013.01); *G06F 3/047* (2013.01)

(58) Field of Classification Search
CPC ....... G01L 19/146; G01L 1/205; G01L 5/228; G01L 19/147; G01L 19/148; G06F 3/03547; G06F 3/047
See application file for complete search history.

(56) References Cited

U.S. PATENT DOCUMENTS

| | | | | |
|---|---|---|---|---|
| RE40,891 E | * | 9/2009 | Yasutake | G06V 30/228 345/157 |
| 2009/0129031 A1 | | 5/2009 | Someya et al. | |
| 2009/0165569 A1 | * | 7/2009 | Taya | G01D 5/183 73/862.041 |
| 2012/0096952 A1 | * | 4/2012 | Amano | G06F 3/0414 901/46 |
| 2012/0240691 A1 | * | 9/2012 | Wettels | G01L 1/24 73/862.624 |
| 2014/0260678 A1 | * | 9/2014 | Jentoft | G01L 5/228 29/595 |

(Continued)

FOREIGN PATENT DOCUMENTS

| | | | |
|---|---|---|---|
| CN | 209611158 U | * | 11/2019 |
| JP | 2004-333273 A | | 11/2004 |

(Continued)

OTHER PUBLICATIONS

WO-2020022011-A1, English Translation (Year: 2020).*

(Continued)

*Primary Examiner* — Ryan D Walsh
(74) *Attorney, Agent, or Firm* — K&L Gates LLP (57) ABSTRACT

According to one embodiment, a pressure detection device includes a buffer layer formed of an elastic material and including a press surface including a biaxially curved surface and an installation surface including a uniaxially curved surface opposing the press surface with an interval therebetween, and a sheet-shape pressure sensor provided in tight contact with the installation surface and uniaxially curved along the installation surface.

13 Claims, 9 Drawing Sheets

(56) References Cited

U.S. PATENT DOCUMENTS

2018/0188838 A1* 7/2018 An .................. G06F 3/0446
2021/0137398 A1* 5/2021 Park .................. A61B 5/02438

FOREIGN PATENT DOCUMENTS

| JP | 2006-090983 A | 4/2006 | | |
|---|---|---|---|---|
| JP | 2019-095262 A | 6/2019 | | |
| WO | WO-2004008096 A1 * | 1/2004 | ............ | A63B 71/06 |
| WO | WO-2020022011 A1 * | 1/2020 | ............ | B25J 13/084 |
| WO | WO-2023051943 A1 * | 4/2023 | | |

OTHER PUBLICATIONS

CN-209611158-U (Year: 2019).*
WO-2004008096-A1 (Year: 2004).*
WO-2023051943-A1 (Year: 2023).*

* cited by examiner

PRESSURE DETECTION DEVICE

CROSS-REFERENCE TO RELATED APPLICATIONS

This application is based upon and claims the benefit of priority from Japanese Patent Application No. 2021-187892, filed Nov. 18, 2021, the entire contents of which are incorporated herein by reference.

FIELD

Embodiments described herein relate generally to a pressure detection device.

BACKGROUND

A flexible sheet-type pressure sensor with such a structure that a thin-film transistor (TFT) and a pressure-sensitive layer are installed on a polyimide base layer, has been proposed. When such a sheet-type pressure sensor is curved, the pressure sensor can be easily curved if the curving axis is uniaxial, or even multi-axial if they are parallel to each other. On the other hand, if the curving axis is two axes that are not parallel to each other, it is difficult to curve the pressure sensor biaxially.

In order to cope with biaxial curving, methods to increase the elasticity of the pressure sensor itself by using expandable wiring, etc., or to provide a cut or a void, such as in a paper-cut structure, have been proposed, but both methods complicate the manufacturing process and reduce the reliability of the sensor.

DETAILED DESCRIPTION

Various embodiments will be described hereinafter with reference to the accompanying drawings. In general, according to one embodiment, a pressure detection device comprises a buffer layer formed of an elastic material and comprising a press surface including a biaxially curved surface and an installation surface comprising a uniaxially curved surface opposing the press surface with an interval therebetween, and a sheet-like pressure sensor provided in tight contact with the installation surface and uniaxially curved along the installation surface.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

A pressure detection device of the first embodiment will now be described in detail.

Figure 1:
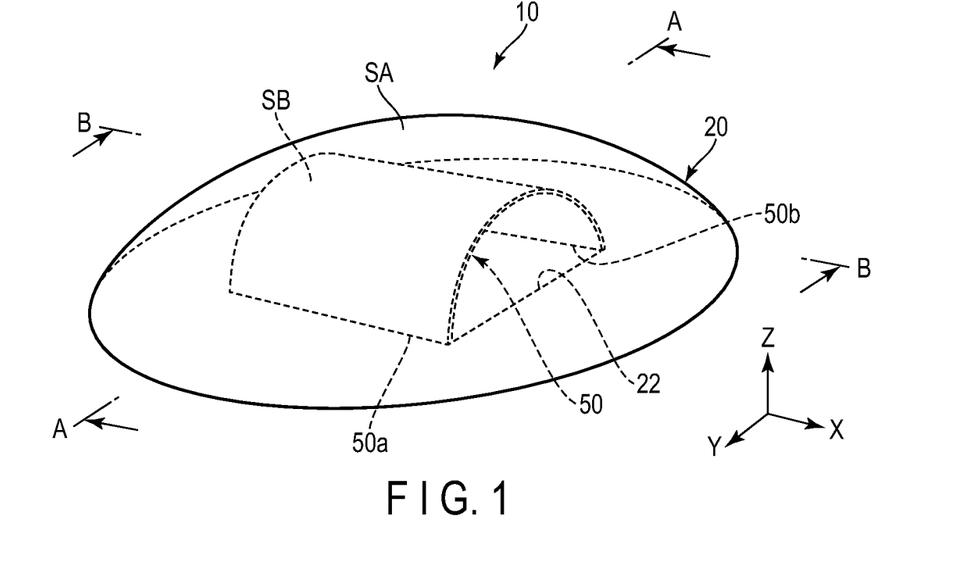
FIG. 1 is a perspective view showing a pressure detection device according to a first embodiment.
Figure 2:
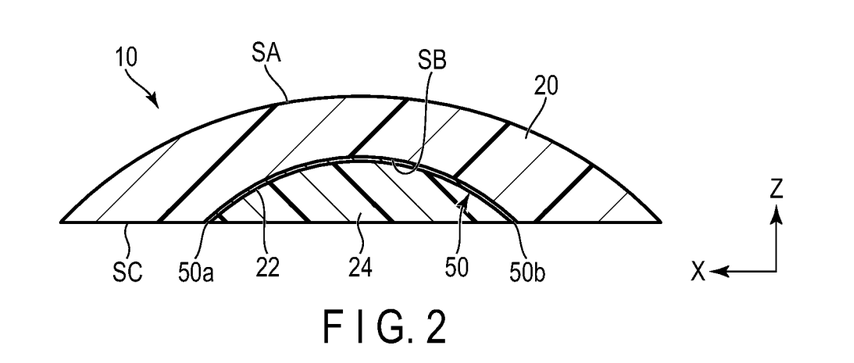
FIG. 2 is a cross-sectional view of the pressure detection device taken along line A-A in FIG. 1.
Figure 3:
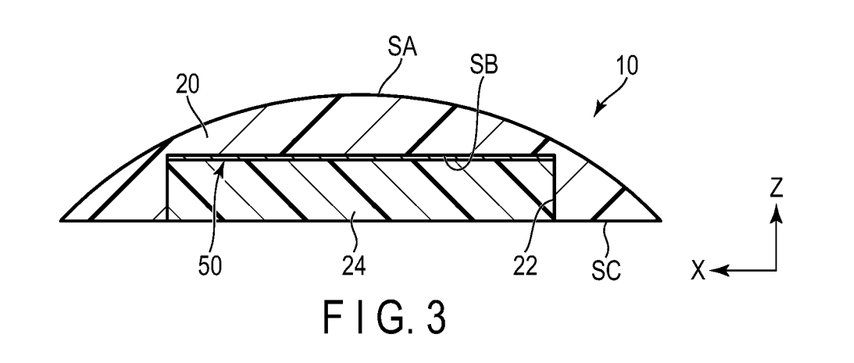
FIG. 3 is a cross-sectional view of the pressure detection device taken along line B-B in FIG. 1.

FIG. 1 is a perspective view showing the pressure detection device according to the first embodiment. FIG. 2 is a cross-sectional view of the pressure detection device taken along line A-A in FIG. 1. FIG. 3 is a cross-sectional view of the pressure detection device taken along line B-B in FIG. 1.

In the figures, a first direction X, a second direction Y and a third direction Z are three directions orthogonal to each other, but they may intersect at an angle other than 90 degrees. In the following descriptions, a direction forwarding a tip of an arrow indicating the third direction Z is referred to as "upward" or "above" and a direction forwarding oppositely from the tip of the arrow is referred to as "downward" or "below".

In addition, it is assumed that there is an observation position to observe the pressure detection device on a tip side of an arrow in the third direction Z, and viewing from this observation position toward the X-Y plane defined by the first direction X and the second direction Y is referred to as a planar view.

Further, in the following descriptions, uniaxially curved surfaces are each defined as a curved surface which is curved around one axis, for example, a 2D surface such as a circular arc surface, cylindrical surface, or triangular pyramid, which becomes a plane when developed. Such uniaxially curved surfaces include curved surfaces each curved around multiple axes that are parallel to each other, that is, for example, curved surfaces curved into an S-shape, wavy shape or the like. Biaxially curved surfaces are each defined as a curved surface that is curved around multiple non-parallel axes, for example, a 3D curved surface such as a spherical surface, a free-form surface, a barrel-shaped surface or the like.

As shown in FIGS. 1 to 3, the pressure detection device 10 of the first embodiment comprises a buffer layer 20 formed of an elastic material such as a synthetic resin, rubber, elastomer or the like, and a sheet-shaped pressure sensor 50 attached to the buffer layer 20.

The buffer layer 20 includes an outer surface (press surface) SA consisting, for example, of a biaxially curved surface such as a convex spherical surface, and a circular flat bottom surface SC opposing the press surface SA. In a central portion of the bottom surface SC, a semi-cylindrical recess 22 having a central axis extending in the first direction X is formed. The bottom surface of the recess 22 is a uniaxially curved surface formed convex toward the press surface SA, which is, here, a semi-cylindrical installation surface SB. The installation surface SB opposes to be spaced apart from the press surface SA.

The pressure sensor 50 is formed into a rectangular sheet shape and includes a pair of rectangular main surfaces (a first main surface and a second main surface) opposing each other. The pressure sensor 50 is disposed within the recess 22. The pressure sensor 50 is adhered to the installation surface SB of the buffer layer 20 by the entire main surface (the first main surface), thus tightly attached to the entire surface of the installation surface SB. The pressure sensor 50 is uniaxially curved along the installation surface SB to form a uniaxially curved surface identical to the installation surface SB, that is, in this case, in a semi-cylindrical shape. The pressure sensor 50 includes a pair of side edges 50a and 50b, which are aligned with each other to be flush with the bottom surface SC of the buffer layer 20.

The recess 22 is filled with a filling material (a core material) 24. The core material 24 can be an elastic or metal material having a rigidity higher than that of the buffer layer 20. The core material 24 is tightly attached to the other main surface (the second main surface) of the pressure sensor 50 and is flush with the bottom surface SC.

Figure 4:
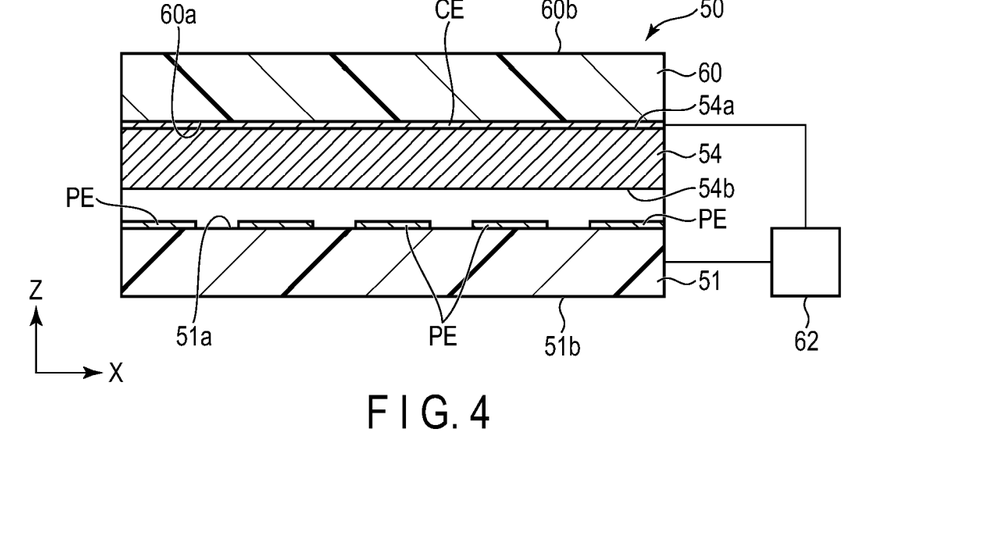
FIG. 4 is a cross-sectional view of a pressure sensor of the pressure detection device.

An example of the pressure sensor 50 will be described. FIG. 4 shows a cross-sectional view of the pressure sensor, and FIG. 5 shows a plan view of the circuit configuration of the pressure sensor.

As shown in FIG. 4, the sheet-shaped pressure sensor 50 comprises an array substrate 51, a sensor layer (pressure-sensitive layer) 54 opposing to be spaced apart from the array substrate 51, and a counter electrode CE and a protective layer 60, stacked in order on the sensor layer 54. The pressure sensor 50 has a thickness in the stacking direction of about 10 to several hundred μm. The pressure sensor 50 includes a controller 62 connected to the array substrate 51 and the counter electrode CE. The controller 62 measures the pressure value of the pressure applied to the pressure sensor 50 and the location where being pressed.

The array substrate 51 is a rectangular-shaped insulating substrate. The array substrate 51 includes a counter-surface 51a opposing the sensor layer 54 and a lower surface 51b opposing the counter-surface 51a. On the counter-surface 51a, a plurality of array electrodes (pixel electrodes) PE are arranged in a matrix. The lower surface 51b forms the second main surface of the pressure sensor 50.

Figure 5:
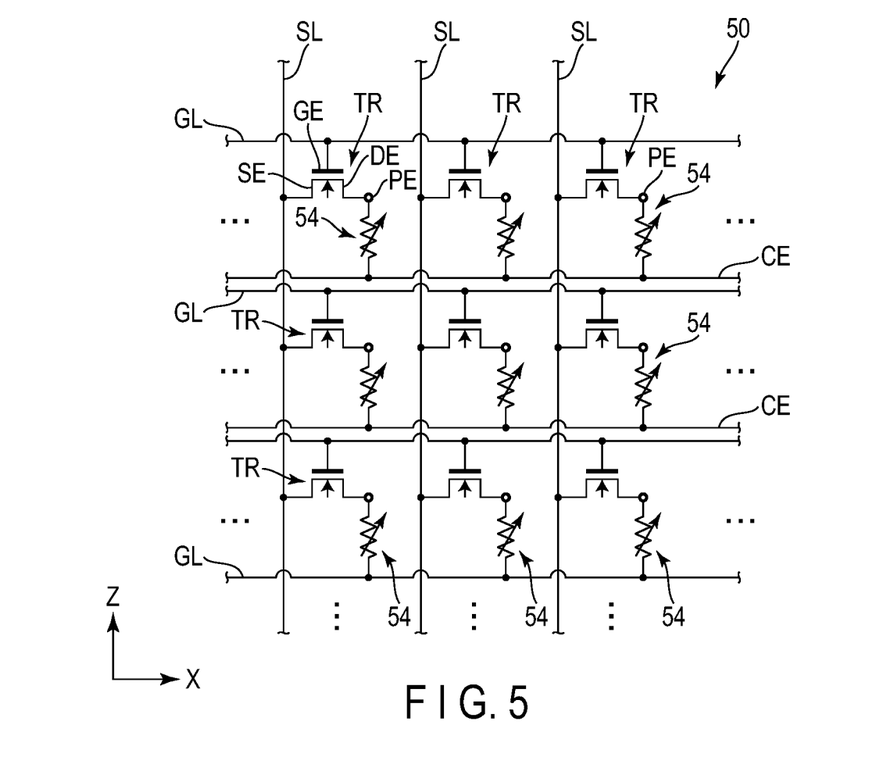
FIG. 5 is a plan view schematically showing a configuration example of the pressure sensor.

As shown in FIG. 5, the array substrate 51 includes a plurality of scanning lines GL parallel to each other, a plurality of signal lines SL parallel to each other and extending orthogonal to the scanning lines GL, and a plurality of transistors TR provided respectively at intersections between the scan lines GL and respective signal lines SL, provided on the counter-surface 51a. The gate electrodes GE of the transistors TR are connected to the scanning lines GL, respectively and the source electrodes SE of the transistors TR are connected to the signal lines SL, respectively. The drain electrodes DE of the transistor TR are connected to the array electrodes PE, respectively. Between the array electrode PE and the counter electrode CE, the sensor layer 54 is disposed.

As shown in FIG. 4, the sensor layer 54 is a sheet member formed into the same shape as that of the array substrate 51 in planar view. The sensor layer 54 includes a first surface 52a and a second surface 52b on an opposite side to oppose the first surface. The sensor layer 54 is formed of a material whose resistance value changes when stress is applied, that is, for example, a pressure-sensitive conductive elastomer prepared by conductive microparticles are dispersed in a highly insulative rubber material. In the sensor layer 54, the conductive microparticles disposed inside the base material are separated from each other. The base material of the sensor layer 54 is made of rubber with low rigidity. Therefore, the sensor layer 54 under normal conditions (when not deformed) exhibits a very high resistance value and is insulative in a thickness direction and in a planer direction. On the other hand, when the sensor layer 54 is pressed from above, the base material depresses at the pressed location toward the array substrate 51. As a result, conductive microparticles contained in the deformed base material are brought into contact with each other and thus the material becomes conductive in the thickness direction. As described the above, the sensor layer 54 is formed of a pressure-sensitive material whose resistance value changes due to pressure applied from the thickness direction.

The first surface 52a of the sensor layer 54 opposes approximately parallel to be spaced apart at a predetermined distance from the counter-surface 51a of the array substrate 51 and the array electrodes PE. The counter electrode CE is stacked on the second surface 52b of the sensor layer 54. The counter electrode CE is a solid electrode deposited on the entire second surface 52b of the sensor layer 54 and is formed into a rectangular shape having a size approximately the same as that of the array substrate 51 in planar view. To the counter electrode CE, a reference voltage is applied from the controller 62.

The protective layer 60 is a sheet material formed into a shape identical to that of the array substrate 51 in planar view. The protective layer 60 is formed of rubber or resin, which has high insulating properties and low rigidity. The protective layer 60 is stacked on the counter electrode CE. The protective layer 60 includes a first surface 60a attached to the counter electrode CE and a second surface 60b on an opposite side. The second surface 60b of the protective layer 60 is equivalent to the first main surface of the pressure sensor 50 and forms a pressure-receiving surface to receive pressure. The counter electrode CE and the protective layer 60 have such a rigidity approximately the same as that of the sensor layer 54, that only the portion pressed by a finger or the like is depressed.

Note that the counter electrode CE may be formed on the first surface 60a of the protective layer 60. In this case, the entire first surface 60a of the protective layer 60 and the entire counter electrode CE are attached on the first surface 54a of the sensor layer 54.

The controller 40 comprises a gate driver (not shown) connected to the scanning lines GL to sequentially select the array electrodes PE, and a source driver (not shown) connected to the signal lines SL. The controller 62 measures the value of the current which flows to the array electrode PE and, based on the measured current value, detects the location (coordinates) in the sensor layer 54, which is deformed by the pressure and the pressing force (pressure value).

Next, an example of the operation of the pressure sensor 50 will be described.

Figure 6:
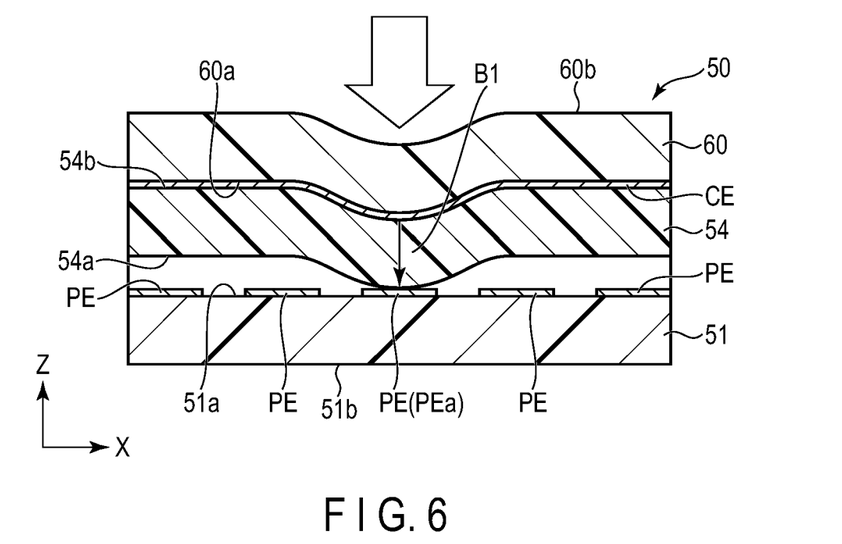
FIG. 6 is a cross-sectional view schematically showing the pressure sensor when it is pressed.

FIG. 6 is a cross-sectional view of the pressure sensor 50 when the first main surface (second surface 60b) thereof is pressed. When the second surface 60b of the protective layer 60 is not pressed, the thickness of the sensor layer 54 is not reduced at any point. Thus, the sensor layer 54 has insulating properties in the thickness direction and no current (signal) flows from the counter electrode CE to the sensor layer 54. On the other hand, as shown in FIG. 6, when the second surface 60b of the protective layer 60 is pressed in the thickness direction, the protective layer 60, the counter electrode CE and the sensor layer 54 are depressed in the pressing direction (stacking direction). As a result, at the pressing point, the first surface 54a of the sensor layer 54 is brought into contact with the corresponding array electrode PE (PEa) and the deformed portion B1 of the sensor layer 54, which is depressed, exhibits a low resistance value. Therefore, the current flows from the counter electrode CE through the deformed portion B1 of the sensor layer 54 to the array electrode PE (PEa). In other words, the deformed portion B1 of the sensor layer 54 is not electrically connected to each of the other array electrodes PE located around the array electrode PEa in the plane direction.

The controller 62 detects that a signal (current) is input to the array electrode PEa and calculates the pressed point (coordinates) and the pressure value.

The pressure sensor 50 with the above-described structure is configured as shown in FIGS. 2 and 3 so that the second surface 60b (the first main surface) of the protective layer 60 is attached to the buffer layer 20 to be in tight contact with the installation surface SB of the buffer layer 20 and curved along the installation surface SB, that is, uniaxially curved.

In this embodiment, the elastic material which forms the buffer layer 20 has a rigidity approximately the same as that of the protective layer 60 of the pressure sensor 50. The buffer layer 20 is formed to have a thickness greater than that of the sensor layer 54 of the pressure sensor 50.

Figure 7:
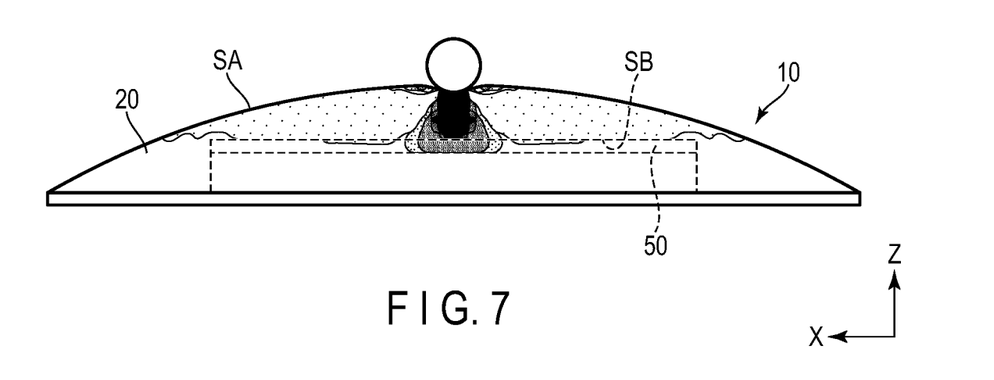
FIG. 7 is a diagram schematically showing a pressure distribution when a central portion of the pressure detection device is pressed.
Figure 8:
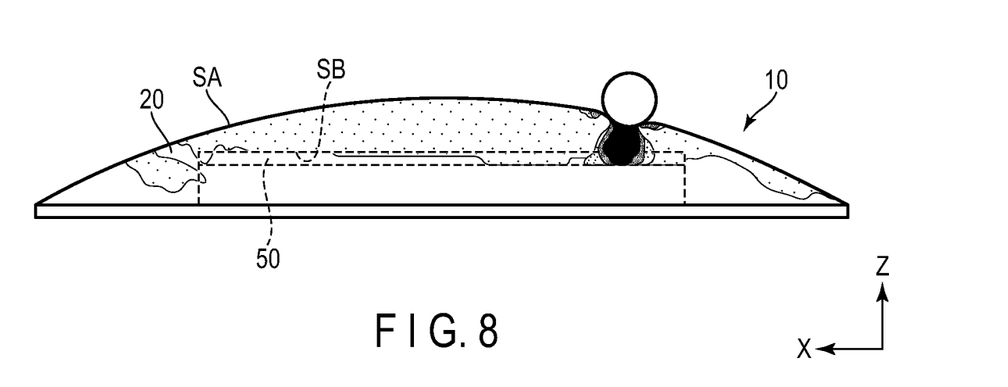
FIG. 8 is a diagram schematically showing a pressure distribution when a peripheral portion of the pressure detection device is pressed.

FIG. 7 is a diagram schematically showing the pressure distribution when substantially the central portion (where the buffer layer is thickest) of the press surface SA of the buffer layer 20 is pressed, and FIG. 8 is a diagram schematically showing the pressure distribution when the periphery portion (where the buffer layer is thin) of the press surface SA is pressed.

In the case where the press surface SA of the buffer layer 20 is spherical (biaxially curved surface), and the pressure receiving surface 60b of the pressure sensor 50 is a semi-cylindrical surface (uniaxially curved), the distance between the press surface SA and the pressure receiving surface 60b, that is, the thickness of the buffer layer 20 is not uniform over the entire surface, but varies from one place to another.

As shown in FIG. 7, when substantially the central portion (where the buffer layer is thicker) of the press surface SA of the buffer layer 20 is pressed, the pressing force (pressure) is somewhat dispersed, and therefore, the dispersed force is projected widely on the pressure sensor 50, that is, the pressure is transmitted to the pressure sensor 50 in a spread manner.

As shown in FIG. 8, when the peripheral portion (where the buffer layer is thin) of the press surface SA is pressed at an angle, the pressing force (pressure) is transmitted to the pressure sensor 50 without being dispersed, but projected in a small spot on the pressure sensor 50.

Figure 9:
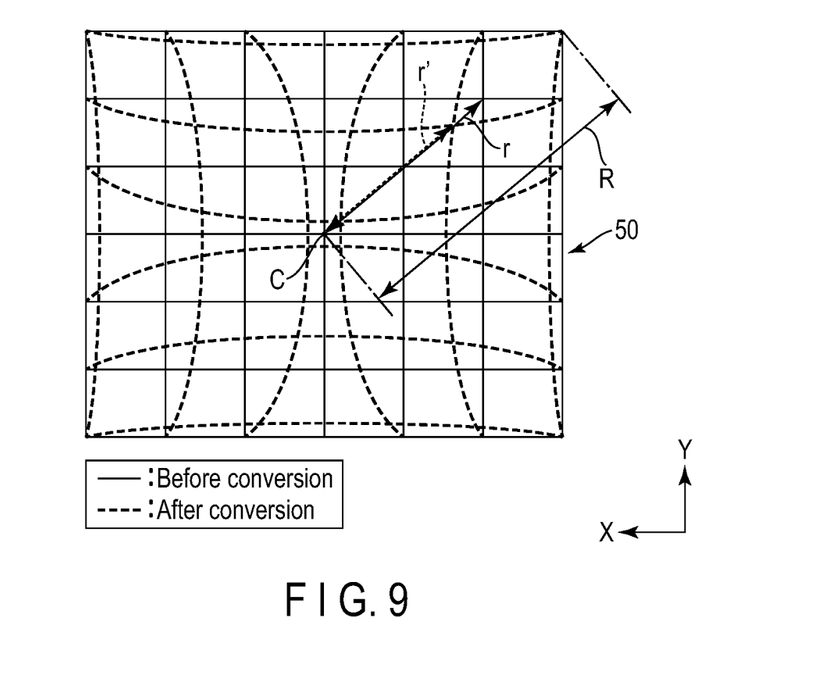
FIG. 9 is a diagram showing sensed pressure distributions before and after conversion of the pressure detection device.

Under these circumstances, the controller 62 corrects (converts) the pressure value detected by the pressure sensor 50 according to the biaxially curved surface of the press surface SA, and thus correctly detect the pressure value applied to the press surface SA. FIG. 9 is a diagram showing a comparison of the pressure-sensitive distribution before and after conversion of the pressure sensor. In FIG. 9, the solid line indicates the sensed pressure distribution before the conversion and the dashed line indicates the sensed pressure distribution after the conversion.

The way the pressure applied to the spherical surface (press surface SA) is reflected (pressure blur) on the semi-cylindrical surface (the pressure-receiving surface 60b) can be easily calculated as a function by a finite element method (FEM) simulation or the like. That is, as shown in FIG. 9, using the thickness and shape of the buffer layer 20 and the like, as parameters, a function or conversion table can be calculated such as to more greatly compress the central portion of the press surface SA, and thus a function or conversion table for conversion can be formed in advance. In the pressure detection device 10 of this embodiment, an example of the function is expressed by the following formula.

$$r' = r - A \times \sin\left(\Pi \frac{r}{R}\right)$$

In the formula, r represents the distance from an image center C to the press position before the conversion, r' represents the distance from the image center C to the press position after the conversion, R represents the distance from the image center C to a diagonal, and A is a constant.

The controller 62 includes a conversion unit which stores the calculated function, which converts the pressure value detected by the pressure sensor 50 by the above-described function to calculate the correct pressure value applied to the spherical surface (press surface SA).

Figure 10:
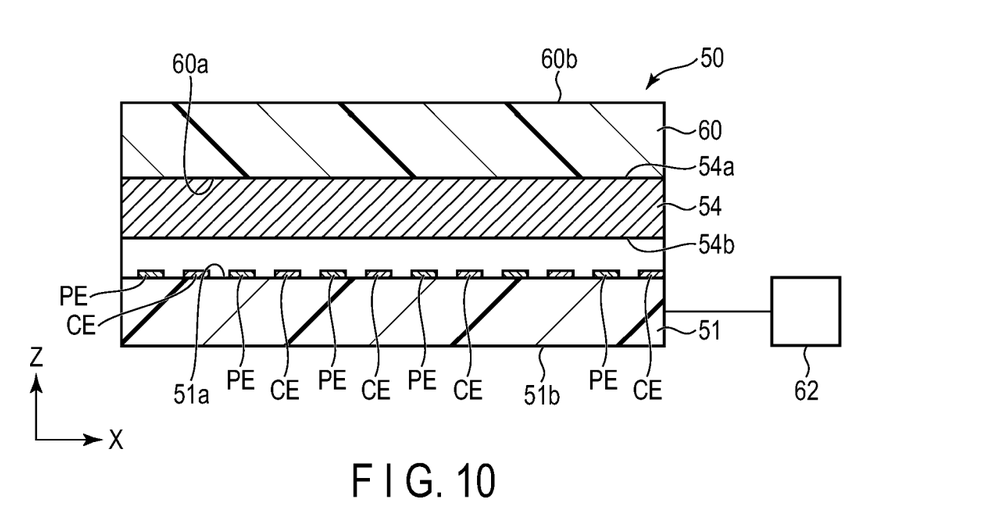
FIG. 10 is a cross-sectional view of a pressure sensor according to a modified example.

Note that the pressure sensor 50 is not limited to the embodiment described above, and various types of pressure sensors can be applied. FIG. 10 is a cross-sectional view of a pressure sensor according to a modified example.

As shown in FIG. 10, according to the modified example, a plurality of counter electrodes CE are provided on the first surface 51a of the array substrate 51 and are disposed to oppose to the corresponding array electrodes (pixel electrodes) PE, respectively, in the plane direction. According to the pressure sensor 50, the pressure points on the protective layer 60 and the sensor layer 54 are depressed towards the array substrate 51 side, and the corresponding part of the sensor layer 54 is brought into contact with the array electrode PE and the counter electrode CE. Thus, the corresponding array electrode PE and the respective counter electrode CE are electrically connected to each other and current flows to the array electrode PE. In this manner, the controller 62 can detect that a signal (current) is input to the array electrode PE and calculate out the pressed point (coordinates) and the pressure value.

Apart from the above, other pressure sensors can as well be applied, such as pressure sensors which detect capacitance changes, matrix pressure sensors and the like.

According to the pressure detection device 10 configured as described above, the pressure sensor 50, which is uniaxially curved, can detect the pressure applied to the press surface having a biaxially curved surface and also the pressure distribution. Thus, the pressure sensor 50 need not to have a biaxially curved surface, thus making it simplifying the manufacturing process and improving the reliability of the pressure sensor.

Figure 11:
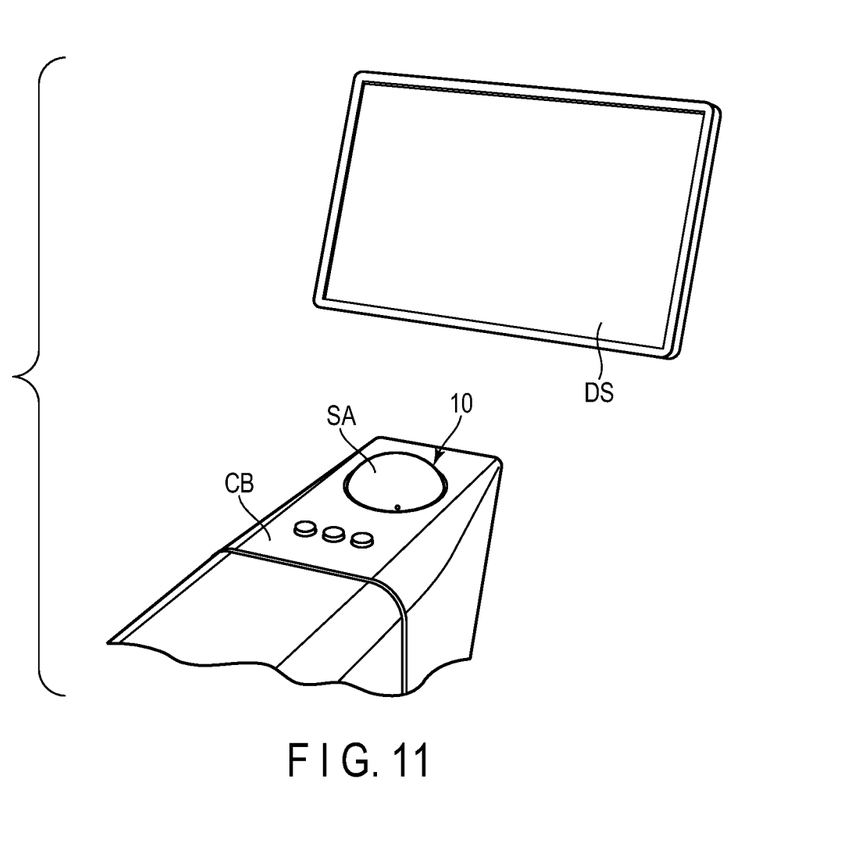
FIG. 11 is a perspective diagram showing an example of use of the pressure detection device.

FIG. 11 is a diagram schematically showing an example of the use of the pressure detection device 10. As shown in the figure, for example, the pressure detection device 10 is installed in a center console box CB of a vehicle and constitutes a touch panel for operating a display DS. The pressure detection device 10 is disposed so that the bottom surface SC is placed on the center console box CB with the press surface SA side being exposed. When the press surface SA is touched, the pressure detection device 10 detects the input operation based on the detected touch position and touch pressure, and the display DS display is controlled accordingly. Note that the pressure detection device 10 can be operated while wearing gloves or the like. Further, a sheet or plastic exterior may be provided over the press surface SA of the buffer layer 20.

Next, pressure detection devices according to another embodiments will be described. In the another embodiments described below, the structural parts identical to those of the first embodiment described above are designated by the same reference symbols as those of the first embodiment and the detailed descriptions thereof may be omitted or simplified.

Second Embodiment

Figure 12:
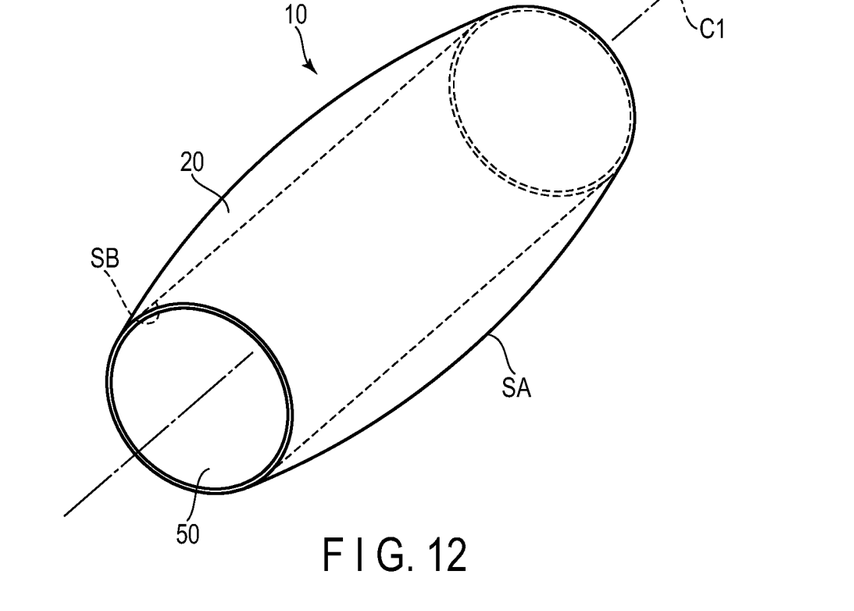
FIG. 12 is a perspective diagram showing a pressure detection device according to a second embodiment.
Figure 13:
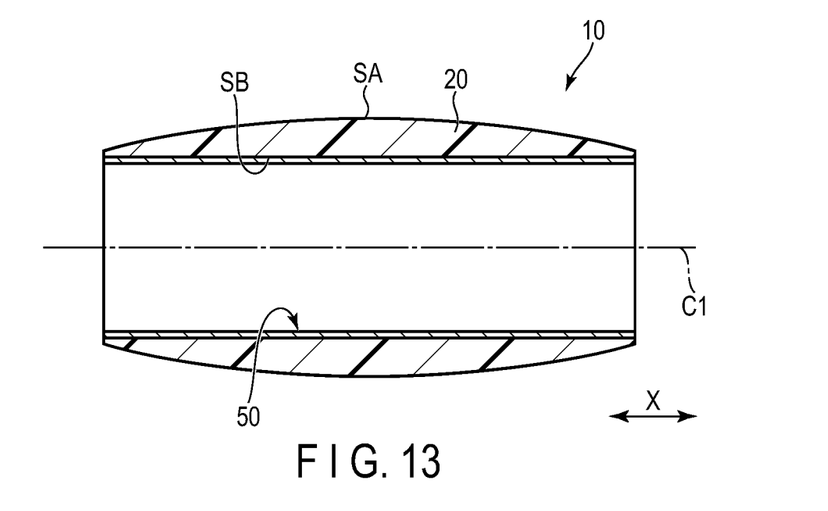
FIG. 13 is a longitudinal cross-sectional view of the pressure detection device according to the second embodiment.

FIG. 12 is a diagram schematically showing a pressure detection device of the second embodiment, and FIG. 13 is a longitudinal cross-sectional view of the pressure detection device.

As shown in the figures, according to the second embodiment, the pressure detection device 10 comprises a buffer layer 20 formed into a cylindrical shape, a sheet-shaped pressure sensor 50 attached to the buffer layer 20, and a controller, not shown, connected to the pressure sensor 50. The buffer layer 20 is formed of an elastic material such as synthetic resin, rubber, elastomer or the like, and includes an outer circumferential surface (press surface SA) which is an approximately barrel-shaped biaxially curved surface and an inner circumferential surface (installation surface SB) which is a cylindrical uniaxially curved surface. The press surface SA and the installation surface SB have a central axis Cl and are located coaxial with each other. The installation surface SB extends from one axial end of the buffer layer 20 to the other axial end. The installation surface SB opposes the press surface SA with an interval provided therebetween. The interval between the press surface SA and the installation surface SB, that is, the thickness of the buffer layer 20, is at the greatest in the axial central portion and gradually decreases toward both axial ends.

The pressure sensor 50 has a configuration similar to that of the pressure sensor in the first embodiment described above. That is, the pressure sensor 50 is formed into a rectangular sheet having a thickness of about 10 to several hundred μm. The pressure sensor 50 includes a pair of rectangular main surfaces (first and second main surfaces) opposing each other. The pressure sensor 50 is attached by the entire main surface (first main surface), to the installation surface SB of the buffer layer 20, which is lightly in contact with the entire surface of the installation surface SB. The pressure sensor 50 is uniaxially curved along the installation surface SB to form a uniaxially curved surface, in this case, a cylindrical shape, which is identical to the installation surface SB. Both axial edges of the pressure sensor 50 are aligned with both axial edges of the installation surface SB, respectively. Note that the pressure sensor 50 cylindrically formed may be configured such as to be attached to the installation surface SB.

The pressure detection device 10 is used in the state where the pressure sensor 50 is attached to a cylindrical or cylindrically columnar core material which is in tight contact with the second main surface of the pressure sensor 50.

The pressure detection device 10 configured as described above can detect, by the uniaxially curved pressure sensor 50, the pressure applied to the press surface SA including a biaxially curved surface and the pressure distribution. Thus, the pressure sensor 50 need not be biaxially curved, thereby making it possible to simplify the manufacturing process and improves the reliability of the pressure sensor.

Figure 14:
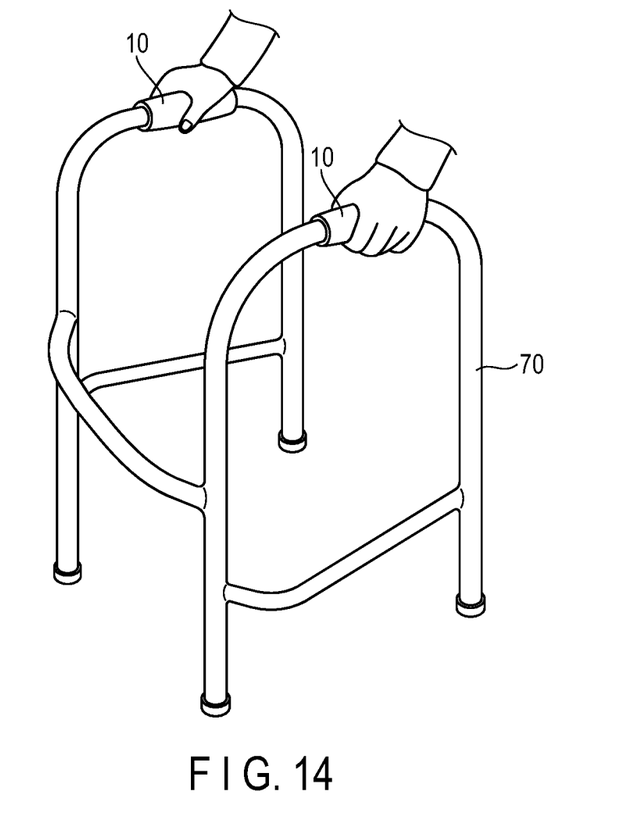
FIG. 14 is a perspective diagram showing an example of use of the pressure detection device according to the second embodiment.

FIG. 14 is a perspective diagram showing an example of the use of the pressure detection device 10. As shown in the figure, for example, the pressure detection device 10 is attached to the frame of a walker 70 and constitutes a grip of the walker 70. The frame is formed from, for example, a cylindrical pipe and is in tight contact with the second main surface of the pressure sensor 50. The pressure detection device 10 can measure, when the user grasps the press surface SA, the gripping force and the pressure distribution. Thus, the pressure detection device 10 can measure the gripping force and pressure distribution even when the user is wearing gloves or the like.

Figure 15:
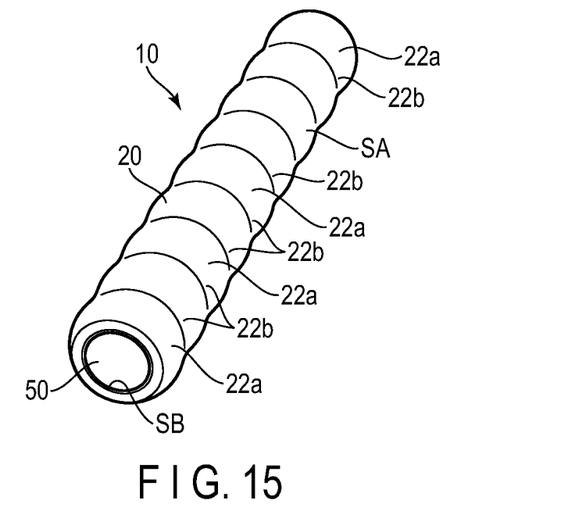
FIG. 15 is a perspective diagram showing a modified example of the second embodiment.

FIG. 15 is a perspective diagram showing a pressure detection device according to a modified example of the second embodiment.

As shown in the figure, the outer circumferential surface (the press surface SA) of the buffer layer 20 may be a biaxially curved surface curved into substantially a bellows shape. The press surface SA has a curved surface shape in which annular convex portions 22a and annular concave portions 22b are aligned alternately along the axial direction. The inner circumferential surface (installation surface SB) of the buffer layer 20 and the sheet-shaped pressure sensor 50 are formed into a cylindrical uniaxially curved surface.

The pressure detection device 10 according to the above-described modified example is suitable for a grip of a bicycle, motorcycle, cane or the like.

In addition, the shape of the biaxially curved surface of the press surface SA of the buffer layer 20 is not limited to the barrel shape or bellows shape described above, but can be modified in various ways according to the usage.

Third Embodiment

Figure 16:
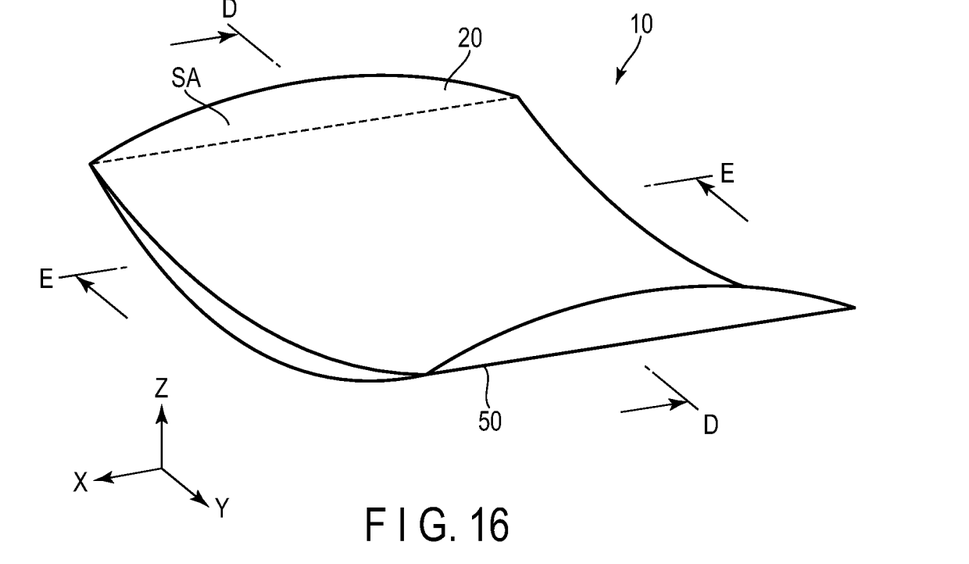
FIG. 16 is a perspective diagram showing a side of a pressed surface of a pressure detection device according to a third embodiment.
Figure 17:
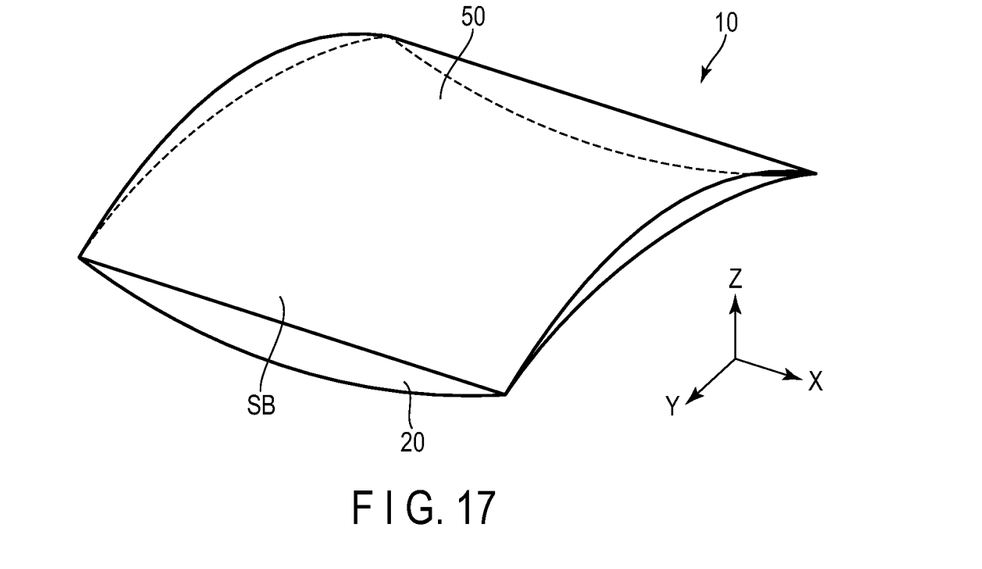
FIG. 17 is a perspective diagram showing a side of a pressure sensor of the pressure detection device according to the third embodiment.
Figure 18:
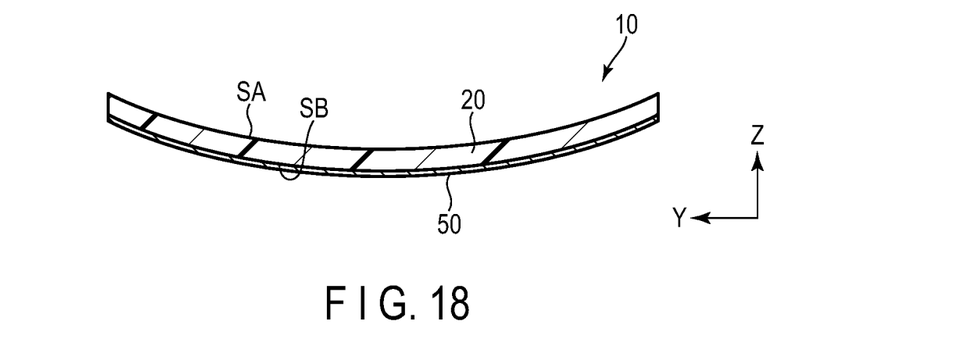
FIG. 18 is a cross-sectional view of the pressure detection device taken along line D-D of FIG. 16.
Figure 19:
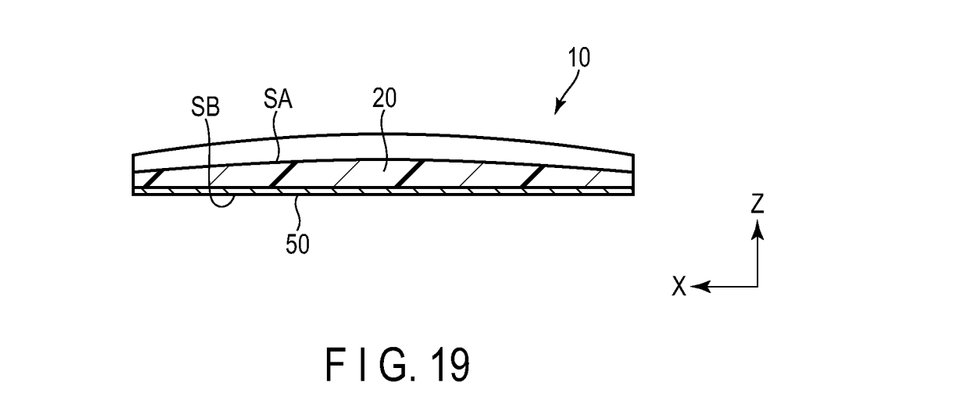
FIG. 19 is a cross-sectional view of the pressure detection device taken along line E-E of FIG. 16.

FIG. 16 is a perspective diagram showing the side of the press surface of a pressure detection device according to the third embodiment. FIG. 17 is a perspective diagram showing the side of the pressure sensor of the pressure detection device according to the third embodiment. FIG. 18 is a cross-sectional view of the pressure detection device taken along line D-D of FIG. 16, and FIG. 19 is a cross-sectional view of the pressure detection device taken along line E-E of FIG. 16.

As shown in the figures, the pressure detection device 10 of the third embodiment comprises a flat and approximately rectangular buffer layer 20, a sheet-shaped pressure sensor 50 attached to the buffer layer 20 and a controller (not shown) connected to the pressure sensor 50. The buffer layer 20 is formed of an elastic material such as synthetic resin, rubber, or elastomer. The buffer layer 20 includes an outer surface (press surface SA) which is a biaxially curved surface and an inner surface (installation surface SB) which is a circular arcuate uniaxially curved surface. The press surface SA is formed into approximately rectangular in planar view and forms a convex arcuate curved surface in the first direction X and a concave arcuate curved surface in the second direction Y.

The installation surface SB opposes the press surface SA with an interval therebetween. The installation surface SB is formed into rectangular in planar view and forms a concave arcuate curved surface with respect to the press surface SA.

The interval between the press surface SA and the installation surface SB, that is, the thickness of the buffer layer 20 is least in the axial central portion and gradually increases toward both axial ends thereof with respect to the second direction Y. The thickness of the buffer layer 20 is greatest in the axial central portion and gradually decreases toward both axial ends thereof with respect to the first direction X.

The pressure sensor 50 has a configuration similar to that of the pressure sensor in the first embodiment described above. That is, the pressure sensor 50 is formed into a rectangular sheet having a thickness of 10 to several hundred μm. The pressure sensor 50 includes a pair of rectangular main surfaces opposing each other. The pressure sensor 50 is attached by one entire main surface (the second surface 60b of the protective layer described above) to the installation surface SB of the buffer layer 20 and is in tight contact with the entire installation surface SB. The pressure sensor 50 is curved along the installation surface SB to form a uniaxially curved surface identical to the installation surface SB, in this case, an arcuate curved surface. The four sides of the pressure sensor 50 are aligned with the four sides of the installation surface SB, respectively.

The pressure detection device 10 configured as described above can be installed on, for example, a chair seat, a support stand, a sofa or the like, and used as a mat, a seat cushion or the like. In this case, the side of the pressure sensor 50 is placed on the seat surface, support stand or the like. When the user sits on the press surface SA, the pressure detection device 10 measures the value of the pressure applied to the press surface SA and the pressure distribution.

In the pressure detection device 10 of the third embodiment configured as described above, the uniaxially curved pressure sensor 50 can detect the pressure applied to the press surface SA including a biaxially curved surface and the pressure distribution. Thus, the pressure sensor 50 need not to be biaxially curved, thereby making it possible to simplify the manufacturing process and improve the reliability of the pressure sensor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the shapes of the press surface and the installation surface of the buffer layer are not limited to those of the embodiments described above, but various other shapes can be selected according to the usage and conditions of use of the pressure detection device. The materials and dimensions of the buffer layer and the pressure sensor are not limited to those of the embodiments described above, but can be varied appropriately as needed. In addition, for the curved surfaces, those of biaxially or more curved surface may as well be applied.

What is claimed is:

1. A pressure detection device comprising:
   a buffer layer formed of an elastic material and comprising a press surface including a biaxially curved surface and an installation surface comprising a uniaxially curved surface opposing the press surface with an interval therebetween; and
   a sheet-shaped pressure sensor provided in tight contact with the installation surface and uniaxially curved along the installation surface.

2. The pressure detection device of claim 1, wherein
   the buffer layer includes the press surface comprising a convex spherical surface, a flat bottom surface opposing the press surface, a recess formed in the bottom surface and the installation surface forming a bottom surface of the recess and being uniaxially curved convex toward the press surface; and
   the pressure sensor is stored in the recess and in tight contact with the installation surface.

3. The pressure detection device of claim 2, further comprising a filler member which fills the recess and seals the recess.

4. The pressure detection device of claim 2, wherein
   the pressure sensor comprises an array substrate on which a plurality of array electrodes are provided, a counter electrode opposing the array electrodes, a pressure sensitive layer provided between the array substrate and the counter electrode, and a protective layer formed of an elastic material and provided over the counter electrode,
   wherein the protective layer is attached to the buffer layer in tight contact with the installation surface.

5. The pressure detection device of claim 4, further comprising a controller connected to the array substrate and the counter electrode, which detects a position where pressure is applied and a value of the pressure, and which converts the detected pressure value according to the curved surface shape of the press surface.

6. The pressure detection device of claim 1, wherein
   the buffer layer includes the press surface biaxially curved into a barrel shape having a central axis and the installation surface uniaxially curved into a cylindrical shape coaxial to the central axis; and
   the pressure sensor is in tight contact with the installation surface and uniaxially curved into a cylindrical shape.

7. The pressure detection device of claim 6, wherein
   the pressure sensor comprises an array substrate on which a plurality of array electrodes are provided, counter electrode opposing the array electrodes, a pressure sensitive layer provided between the array substrate and the counter electrodes, and a protective layer formed of an elastic material and provided over the counter electrode,
   wherein the protective layer is attached to the buffer layer in tight contact with the installation surface.

8. The pressure detection device of claim 7, further comprising a controller connected to the array substrate and the counter electrode, which detects a position where pressure is applied and a value of the pressure, and which converts the detected pressure value according to the curved surface shape of the press surface.

9. The pressure detection device of claim 1, wherein
the buffer layer includes the press surface comprising a biaxially curved surface including a concave curved surface and the installation surface comprising a uniaxially curved surface concave to the press surface; and
the pressure sensor is provided in tight contact with the installation surface and is concave uniaxially curved along the installation surface.

10. The pressure detection device of claim 9, wherein
the pressure sensor comprises an array substrate on which a plurality of array electrodes are provided, counter electrode opposing the array electrodes, a pressure sensitive layer provided between the array substrate and the counter electrodes, and a protective layer formed of an elastic material and provided over the counter electrode,
wherein the protective layer is attached to the buffer layer in tight contact with the installation surface.

11. The pressure detection device of claim 10, further comprising a controller connected to the array substrate and the counter electrode, which detects a position where pressure is applied and a value of the pressure, and which converts the detected pressure value according to the curved surface shape of the press surface.

12. The pressure detection device of claim 1, wherein
the pressure sensor comprises an array substrate on which a plurality of array electrodes are provided, a counter electrode opposing the array electrodes, a pressure sensitive layer provided between the array substrate and the counter electrode, and a protective layer formed of an elastic material and provided over the counter electrode, and
the protective layer is attached to the buffer layer in tight contact with the installation surface.

13. The pressure detection device of claim 12, further comprising a controller connected to the array substrate and the counter electrode, which detects a position where pressure is applied and a value of the pressure, and which converts the detected pressure value according to the curved surface shape of the press surface.

* * * * *